(No Model.)

C. F. PURDIE.
CAPSULE MACHINE.

No. 276,280. Patented Apr. 24, 1883.

WITNESSES
Samuel E. Thomas.
J. Edward Warren

INVENTOR
Charles F. Purdie,
By W. W. Leggett.
Attorney

UNITED STATES PATENT OFFICE.

CHARLES F. PURDIE, OF DETROIT, MICHIGAN.

CAPSULE-MACHINE.

SPECIFICATION forming part of Letters Patent No. 276,280, dated April 24, 1883.

Application filed August 26, 1882. (No model.)

*To all whom it may concern:*

Be it known that I, CHARLES F. PURDIE, of Detroit, county of Wayne, State of Michigan, have invented a new and useful Improvement in Capsule-Machines; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

Figure 1:
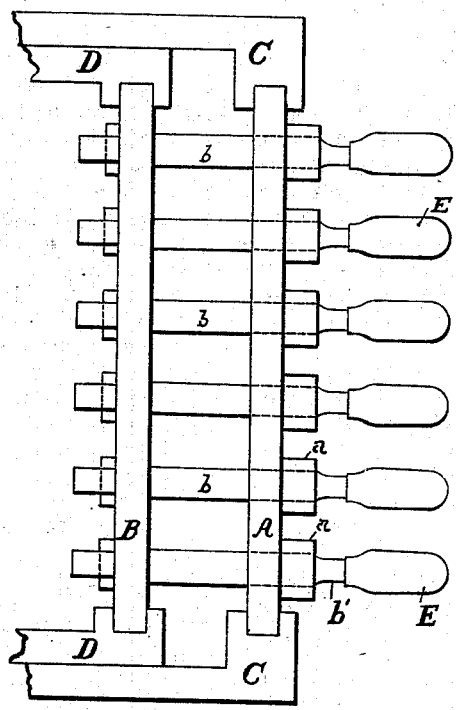
Figure 2:
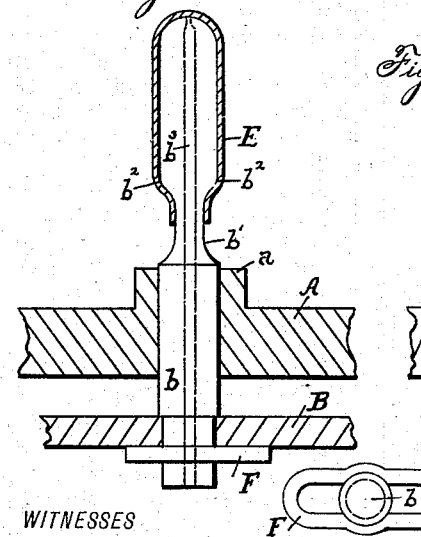
Figure 3:
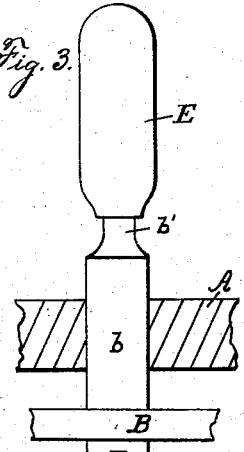
Figure 4:
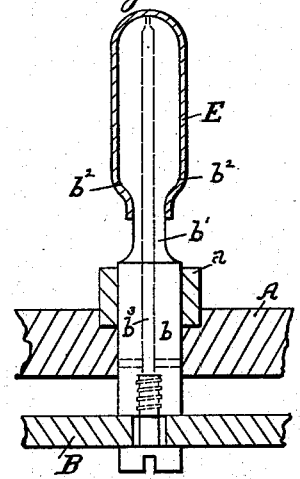

In the drawings, Figure 1 is an end view of an apparatus embodying my invention. Fig. 2 represents a separate view of one of the mold-pins. Fig. 3 is a variation; also, Fig. 4 is a sectional view of the same.

Heretofore in the manufacture of gelatine capsules by machinery the operation has been quite complex, necessarily involving much expense for labor. It has been customary, first, to form the capsules by dipping the capsule-molds into the gelatine, then to cut them in a machine adapted simply to that purpose, and then to remove them from the molds by still another machine.

It is the object of my invention to construct a machine for simplifying these processes, and thereby to lessen the expense of manufacture and to perform the cutting and removing in one and the same machine. I accomplish this result by constructing a sleeved plate, in combination with an adjustable mold-plate provided with a series of molds, each provided with a circular groove, the construction being such that when the mold-plate is drawn back the capsules formed on the molds will be cut off and removed simultaneously.

In the drawings, A represents a plate or rack provided with a series of sockets or sleeves, $a$. Said sockets may be simply made even with the plate itself, as shown in Fig. 3. I prefer, however, that the plate should be provided with projecting sleeves secured thereto in any proper manner, as shown in Figs. 1 and 2.

B is a plate or rack, constructed in any proper manner and form, provided with a series of capsule molds or pins, $b$, secured thereto in any proper way. I prefer to secure said molds to the plate by means of a split key, F, passed over the head of the mold, as shown in Fig. 2; but I do not limit myself to such a fastening for the molds. I construct these molds with a circular groove, $b'$, located at any suitable distance from the outer end, the length of the capsule coinciding with the distance from the outer end of the pin to said groove. Said pins may be straight or tapering from the groove to the outer end. By making them straight they can be made at less expense.

C is any suitable frame in which the sleeved plate A may be secured.

D represents adjustable guides to which the mold-plate B may be properly secured. Said guides are adapted to be projected forward and backward by any suitable mechanism, together with the mold-plate secured thereto.

E represents capsules formed upon the mold-pins.

The operation of the device will now be understood. Having first projected the molds $b$ through the sleeves $a$, they are then dipped in the gelatine to such a depth that the gelatine will form upon the depression of the groove $b'$ sufficiently to permit the sleeves or sockets $a$ in the plate A to pass over the end of the capsule at that point. It will be seen, when the capsule is so formed and suitably dried, by withdrawing the mold-plate, with its series of molds, until the edge of the groove $b^2$ is reached, the edge of the sleeve will come into contact with the capsule, and that the further removal of the mold-plate will cut the capsules on the outer periphery of the groove $b^2$, as the molds are closely fitted to the sleeves, and as the removal of the mold-plate is continued the capsules will be crowded off from the mold-pins.

I find in practice that it is helpful to the removal of the molds from the capsules to provide said molds with a suitable interior air-passage, $b^3$, to admit air to the interior of the capsule when the mold is withdrawn. I would have it understood that I desire to construct the molds with or without said air-passage.

Heretofore after the capsules had been cut it was necessary to remove them from the molds by clamps. By dispensing with the use of clamps altogether it is evident that a much thinner capsule can be made, as it is not necessary to give them the strength required to stand the strain of the clamps. The capsules, being made thinner, will require less gelatine in their manufacture, effecting a saving in cost, and they will at the same time be more easily dissolved. By dispensing with the use of the clamps and the revolving cutters ordinarily employed it is evident, also, that the pins can be located much nearer together, so that the mold-plate can be provided with a much greater number of pins than has been formerly the case.

I do not here claim specifically the construction of the plate with an outwardly projecting or extended sleeve, as such forms the subject-matter of a separate application for Letters Patent, but is there provided to perform an additional function from the sleeve in the present case.

What I claim is—

1. In a capsule-machine, the combination, with a plate having one or more sockets, of a mold pin or pins having a circular groove, $b'$, and arranged to be reciprocated through the socket or sockets in the said plate for cutting and stripping off the capsule, substantially as described.

2. In a capsule-machine, the combination, with a plate provided with one or more sockets or sleeves, of a movable mold-plate carrying one or more capsule-molds arranged to be reciprocated in the said sockets or sleeves, substantially as and for the purpose described.

3. In a capsule-machine, the combination, with a plate provided with one or more sockets or sleeves, of a movable plate carrying one or more capsule-mold pins having a circular groove between their outer ends and the plate which carries them, said mold-plate being arranged to be reciprocated for projecting the mold-pins back and forth in the said sockets or sleeves, substantially as and for the purpose described.

4. In a capsule-machine, the combination of a frame, C, a plate, A, secured thereto, and provided with one or more sockets or recesses, $a$, adjustable guides D, arranged to be moved on the said frame, and a plate, B, attached to the guides and carrying one or more mold-pins, substantially as and for the purpose described.

5. In a capsule-machine, a mold-pin provided with a suitable air-passage, substantially as and for the purpose described.

In testimony whereof I sign this specification in the presence of two witnesses.

CHARLES F. PURDIE.

Witnesses:
J. EDWARD WARREN,
N. S. WRIGHT.